United States Patent [19]
Yohner

[11] Patent Number: 5,125,624
[45] Date of Patent: Jun. 30, 1992

[54] APPARATUS FOR A DISC-STEM CONNECTION

[75] Inventor: Paul A. Yohner, Harris County, Tex.

[73] Assignee: Keystone International Holdings Corp., Houston, Tex.

[21] Appl. No.: 638,686

[22] Filed: Jan. 8, 1991

[51] Int. Cl.⁵ .............................................. F16K 1/22
[52] U.S. Cl. .................................... 251/308; 251/305
[58] Field of Search ................. 251/305, 308; 137/315

[56] References Cited

U.S. PATENT DOCUMENTS 868,182 10/1907 Hayden .
3,539,148 11/1970 Boos, Jr. .
4,688,594 8/1987 Gardner .

FOREIGN PATENT DOCUMENTS 1119122 6/1956 France .................... 251/308

Primary Examiner—John C. Fox
Attorney, Agent, or Firm—Browning, Bushman, Anderson & Brookhart

[57] ABSTRACT

Disc-stem connection for a butterfly valve using interfitted slots on the disc and stem for mechanical connection. An oversize slot on the disc creates channels between the disc and the stem which allows deep penetration of a weld bead. Centralization of the stems within the oversize slots is effected by means of small spacers interposed between the stems and the slot edges. The spacers are small enough so that the necessary space created for the weld is not displaced.

9 Claims, 2 Drawing Sheets

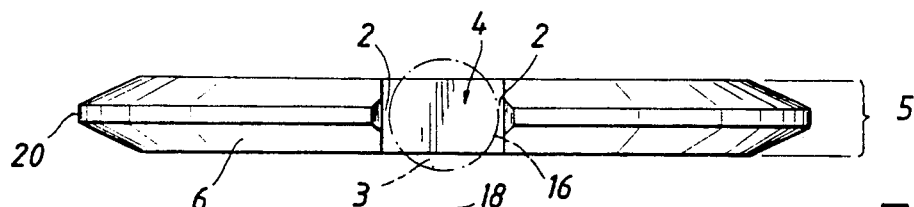
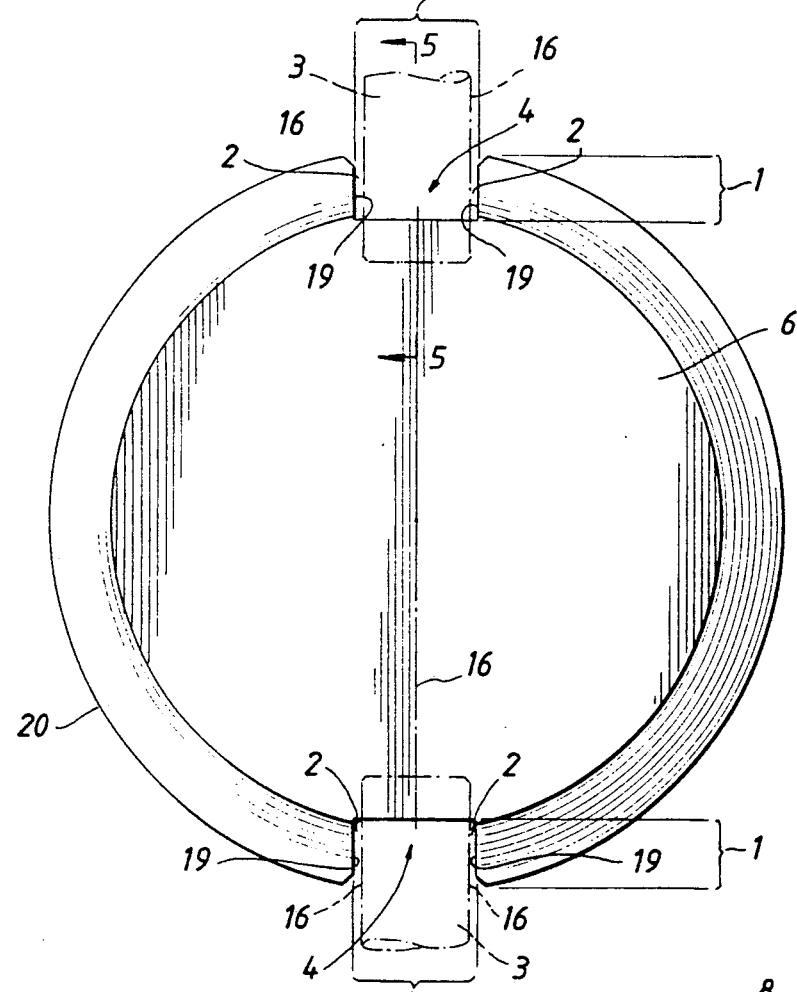
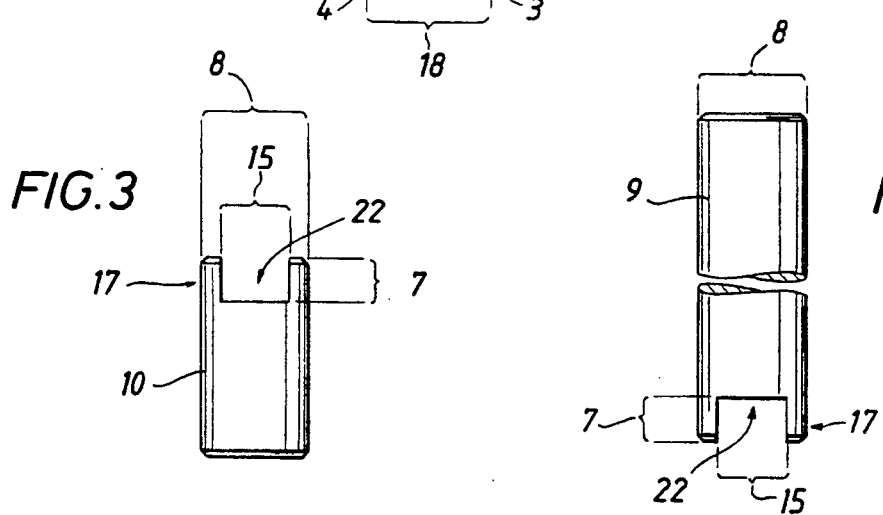
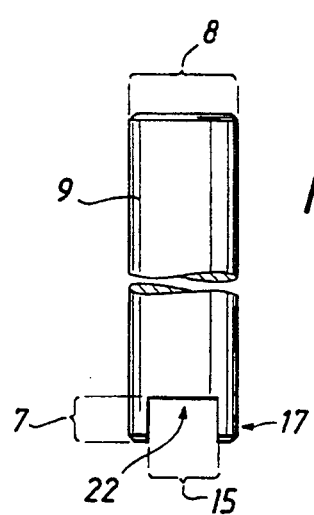

5,125,624

APPARATUS FOR A DISC-STEM CONNECTION

BACKGROUND OF THE INVENTION

1. Field of the Invention

The present invention relates generally to disc-stem connections and, more particularly, to apparatus for disc-stem connections in butterfly valves.

2. Description of the Prior Art

In recent years, industry has developed a need for moderately priced butterfly valve disc-stem assemblies which are strong enough to meet or exceed valve load requirements. The connection at the stem and the disc is often the weakest link in the assembly and therefore is a point at which breakdowns often occur when the valve is operating under pressure.

Various types of connections are known in the art but they are unsuitable to making a strong, rigid, properly aligned connection or too costly to be price effective.

A mechanical connection of the stem to the disc can be made by having slots on the stem and the disc that interlock with each other. This technique is shown in G. W. Hayden U.S. Pat. No. 868,182 and uses an interlocking slot connection with one stem on one side of the disc in a butterfly valve. The slot in the disc is made wide enough so that the connection has some play. A pivoting spur connection is employed on the other side of the disc. Accordingly, the disc is provided with enough latitude to self adjust itself into the valve body. The Hayden patent does not suggest how to make an industrial strength, rigid connection between the stem and the disc. And in fact, rigidity of the connection would defeat the essence of the invention. The patent also does not suggest how two valve stems connected in this way could be aligned with each other or to the center of the disc. The technique does not lend itself to producing valves strong enough for the desired industrial applications.

U.S. Pat. No. 3,539,148 shows an interlocking slotted connection but does not suggest any bonding of the connection, or any special techniques of bonding, or means for assuring accurate alignment of the stems, that would make the connection suitably strong for higher pressure industrial applications.

U.S. Pat. No. 4,688,594 shows how pins may be used to effect a disc-stem connection. This technique creates connections strong enough to be useful but is rather complicated so that the production price is undesirably high.

Consequently, a need exists for improvements in the art of making disc-stem connections for butterfly valves which will result in greater reliability and dependability at reduced levels of capital investment.

OBJECTS OF THE INVENTION

The present invention provides an apparatus designed to satisfy the aforementioned needs. This invention utilizes slots on the stem and the disc which are interfitted to form a mechanical connection. At least one of the slots is designed to be overly wide or larger than necessary for the disc and stem slots to interfit with each so that a welding bead can penetrate deeply into generally channel shaped spaces created between the stem and the disc. In this way, a connection between the stem and the disc is created that is strong enough for demanding industrial applications. In order to properly align the stems to the disc without necessarily using elaborate fixtures, the invention employs small spacers which provide for a precision alignment. The small spacers may displace some of the spaces created by the overly wide slot. However, the spaces, or channels, remain large enough so that the welding bead can penetrate deeply enough to effect the desired strength of the connection. Due to the relatively uncomplicated construction involved, costs are held in moderation. More specifically, appropriate widths and depths of the slots should be selected depending on the thickness of the disc and the diameter of the stems and also on the desired percentage and depth of the weld bead penetration.

BRIEF DESCRIPTIONS OF THE DRAWINGS

FIG. 1 is a top view of a butterfly valve disc according to the present invention showing overly wide slots disposed in the disc.

FIG. 2 is a side view of the butterfly valve disc according to FIG. 1.

FIG. 3 is a side view showing a lower stem having a slot disposed in one end.

FIG. 4 is a side view showing an upper stem having a slot disposed in one end.

DESCRIPTION OF THE PREFERRED EMBODIMENT

Figure 5:
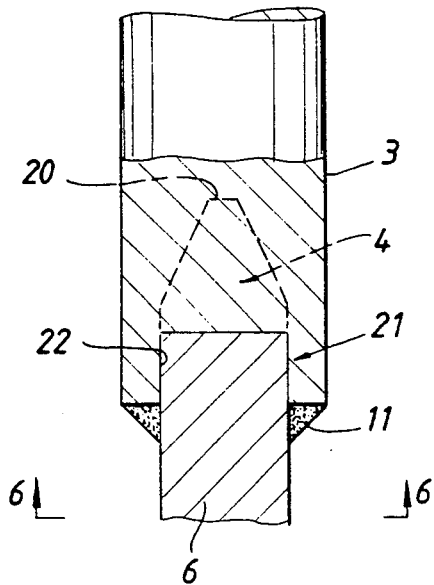
FIG. 5 is an elevational view, partly in section, along the lines 5—5 of FIG. 1 which shows the welded interfitting connection of the stem and disc.
Figure 6:
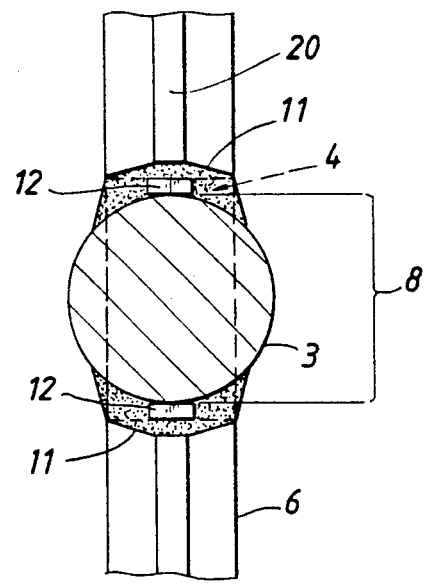
FIG. 6 is an elevational view, partly in section, along the lines 6—6 of FIG. 5. showing the welding bead penetrating the channel between the sides of the stem and the edges of the slot in the disc.

Referring now to the drawings, and more particularly to FIG. 1, which shows a butterfly valve disc 6 which incorporates a preferred embodiment of the present invention. The disc 6 has slots 4 disposed in it such that the width 18 of the slots 4 is greater than necessary to accommodate the stems 3. This creates channels 2 along an interfitted portion of the mating end 17 of the stems and the depth 1 of the slots 4 in the disc 6. These channels allow greater welding bead 11 penetration as shown in FIG. 5 and FIG. 6 so that industry requirements for a strong bond between the stems 3 and the disc 6 can be effected. Generally a weld bead 11 is expected to be used to effect the bond. However, bonding using other techniques including glues, magnetic operations, as well as the many different methods of welding operations well known in the art are contemplated by the present invention.

In a preferred embodiment, the present invention includes an upper stem 9 and a lower stem 10 as shown in FIG. 3 and FIG. 4. The upper stem 9 and the lower stem 10 have a slot 22 disposed within their respective mating ends 17. The width 15 of this slot 22 is just large enough to make a slip fit over the disc 6. In other words, the width 15 of slot 22 in FIG. 3 and FIG. 4 is practically equivalent to the disc thickness 5 shown in FIG. 2.

Figure 7:
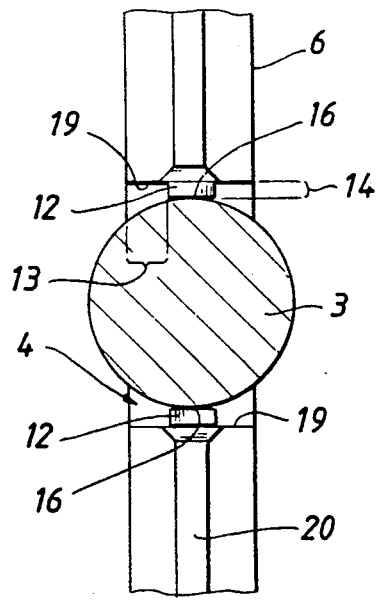
FIG. 7 is an elevational view, partly in section, according to FIG. 6 but without the welding bead.

The disc 6 shown in FIG. 1 has an edge 20 into which two slots 4 are disposed directly opposite each other. These slots 4 are larger than necessary to accommodate the stems 3. The alignment required in the preferred embodiment is fulfilled when a center line 16 can be drawn through the center axis of the stems 3 and the center of disc 6. In other applications, centralization may only require the center axis of the stems 3 to be aligned. To achieve this alignment, spacers 12 of FIG. 6 and FIG. 7 are interposed between the stem sides 16 and slot 4 edges 19. The spacers 12 should have the width necessary to center the stems 3 in the slots 4. So that the advantage obtained by having slot 4 being larger than necessary to accommodate the stem 3, namely additional space with which to effect a stronger welding bead, is not lost, the spacers 12 should be thin enough so that the channel depth 13, of FIG. 7, allows sufficient weld bead penetration depth for an adequately strong disc-stem connection. The general minimum limitation on the thickness of the spacers 12 is determined by their capability to physically maintain alignment during the welding operation. This same general minimum limitation applies in determining the length of the spacers 12. The spacers 12 should also be long enough to prevent the stems 3 from becoming cocked in the slots 4. If some means is available to physically hold the stem 3 and disc 6 in alignment, a weld bead 11 could fix the alignment itself.

The channel width 14, of FIG. 7, in a preferred embodiment is ⅛ inch. This allows a weld bead 11 penetration of 85% to 90%. The stem slot depth 7, of FIG. 3 and FIG. 4, in the preferred embodiment is ⅓ of the disc thickness 5 of FIG. 2. The overly wide slot depth 1, of FIG. of the preferred embodiment is ⅓ of the diameter 8 of the lower stem 10 or upper stem 9. The lower stem 10 or upper stem 9 diameter 8 is chosen to be ½ inch greater than the disc thickness 5.

Although the beveled edges of the disc 6, and the chamfers of the slots disposed in disc 6, are not a part of this invention, they are shown to illustrate more realistically the expected form of the disc.

Figure 8:
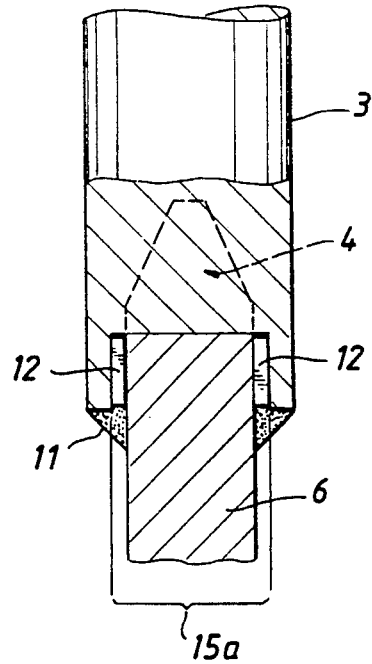
FIG. 8 is a cross section view according to FIG. 5 but showing the possibility of an overly wide slot in the stem rather than the disc.

FIG. 8 shows that slot 15a in the stem 3 could made be larger than necessary to accept the disc 6 instead of having the slot 4 in the disc 6 being made larger than the diameter 8 of the stem 3. For that matter, it is conceivable that a strong weld may be possible if slots in both the stem 3 and the disc 6, designated by the numerals 4 and 15a, are made wider than necessary to receive each other. As well, it might be possible to create an additional welding channel on the mating end 17 of the stem 3 by leaving off one shoulder or a part of one shoulder of the stem slot 22 and by not seating the stem 3 as deeply in slot 4 of the disc as physically possible. Another possible arrangement would effect alignment by placing the stem 3 along one edge of a slot in the disc, while leaving a space on the other side of the stem for extra weld bead penetration. As can be appreciated, a number of useful strategies using the basic ideas embodied by this invention are conceivable.

It is thought that the disc-stem connection of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A disk-stem connection, comprising:
   (a) a stem with a mating end, said mating end having a first slot disposed within it;
   (b) a disc with an edge, said edge having a second slot;
   (c) said first and second slots being large enough to permit said first slot and said second slot to be mutually received in each other to thereby allow said disc and said stem to interfit with each other and form interfitted portions of said disc and said stem, at least one of said slots being larger than necessary for said stem and said disc to interfit with each other thereby forming channels between said interfitted portions of said disc or said stem;
   (d) a bonding means for bonding the stem and the disc together such that said bonding means is received in said channels; and
   (e) a centralizing means received in said channels, said centralizing means displacing such a portion of said channels that said bonding means can enter said channels to securely affix said stem to said disc.

2. A disc-stem connection as recited in claim 1, wherein said means for bonding includes:
   (a) a welding bead formed between said stem and said disc such that said welding bead penetrates into said channels to securely affix said disc to said stem.

3. A disc-stem connection as recited in claim 1, wherein:
   (a) said bonding means is said centralizing means.

4. A disc-stem connection as recited in claim 1, wherein said centralizing means includes:
   (a) spacers interposed between said interfitted portions of said disc or said stem.

5. A disc-stem connection as recited in claim 1, wherein said centralizing means includes:
   (a) spacers interposed between said interfitted portion of said disc or said stem that are wide enough to accurately centralize said first and second slots within each other, said spacers being smaller than said channels, said spacers having a length adequate to securely hold said first and second slots in a centralized position while said stem is bonded to said disc with said bonding means.

6. A disk-stem connection as recited in claim 2, wherein:
   (a) said channels have a width such that at least 85% to 90% weld bead penetration is received into said channels.

7. A disk-stem connection as recited in claim 1, wherein:
   (a) said width of said second slot is from ⅛ to 6/8 of an inch wider than necessary to receive said mating end of said stem.

8. A disk-stem connection as recited in claim 1, wherein:
   (a) said stem has a diameter equal to the thickness of said disc plus from ¼ to 4/4 inches, said first slot in said mating end of said stem has a depth ranging from 1/6 to 3/6 of the thickness of said disc, said first slot in said mating end of said stem has a width just large enough to make a slip-over fit onto said disc; and
   (b) said second slot in said disc having a depth ranging from 1/6 to 3/6 of the diameter of said stem.

9. A disc-stem connection, comprising:
   (a) an upper and a lower stem, each stem having a mating end, said upper mating end having a first slot disposed therein, said lower stem mating end having a second slot disposed therein;

(b) a disc with an edge, the edge of the disc having a third and a fourth slot disposed in it;

(c) said first and third slots being large enough to permit said first and third slots to be mutually received in each other to thereby allow said disc and said upper stem to interfit with each other and form interfitted portions of said disc and said upper stem, at least one of said first and third slots being larger than necessary for said upper stem and said disc to interfit with each other thereby forming channels between said interfitted portions of said disc or said upper stem;

(d) said second and fourth slots being large enough to permit said second and fourth slots to be mutually received in each other to thereby allow said disc and said lower stem to interfit with each other and form interfitted portions of said disc and said lower stem, at least one of said second and fourth slots being larger than necessary for said lower stem and said disc to interfit with each other thereby forming channels between said interfitted portions of said disc or said lower stem;

(e) a bonding means for bonding said upper and lower stems and said disc together such that said bonding means is received in said channels; and (f) a centralizing means received in said channels, said centralizing means displacing such a portion of said channels that said bonding means can enter said channels to securely affix said stem to said disc.

* * * * *